(No Model.)
J. TRANCLÉ-ARMAND.
COMBINED BICYCLE AND VEHICLE.
No. 559,761.           Patented May 5, 1896.
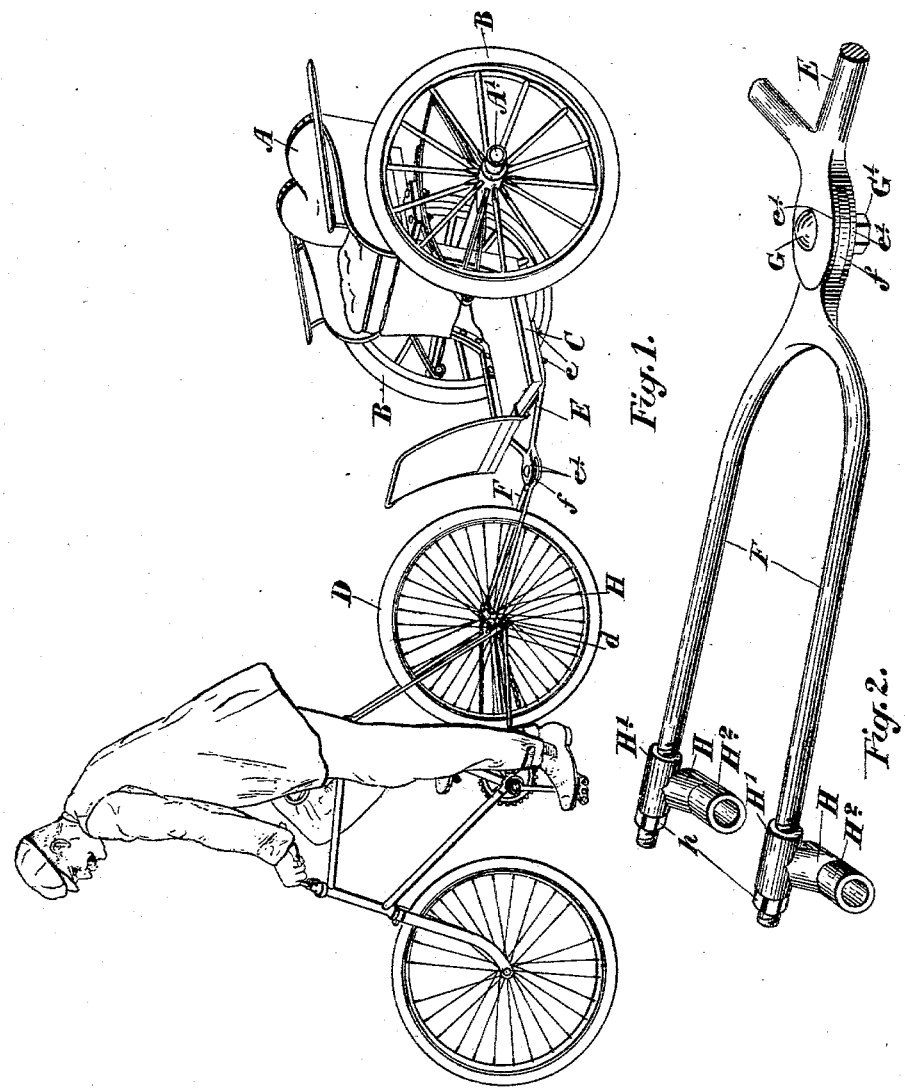
Witnesses.
H. T. S. Young
E. R. Case.
Inventor:
J. Tranclé-Armand
by Fetherstonhaugh & Co
Attys

UNITED STATES PATENT OFFICE.

JEAN TRANCLÉ-ARMAND, OF TORONTO, CANADA.

COMBINED BICYCLE AND VEHICLE.

SPECIFICATION forming part of Letters Patent No. 559,761, dated May 5, 1896.

Application filed August 5, 1895. Serial No. 558,225. (No model.)

*To all whom it may concern:*

Be it known that I, JEAN TRANCLÉ-ARMAND, manufacturer, of the city of Toronto, in the county of York, in the Province of Ontario, Canada, have invented certain new and useful Improvements in a Combined Bicycle and Vehicle, of which the following is a specification.

My invention relates to improvements in combined bicycles and vehicles; and the object of the invention is to design a simple contrivance for connecting the rear wheel of the bicycle to a vehicle, (preferably two-wheeled,) so that the vehicle and bicycle may be combined in such a manner that the vehicle may be readily drawn and easily turned around when being drawn; and it consists, essentially, of a forked bracket having the rear end secured beneath the bottom of the vehicle and the front end flattened into two jaws of disk form, between which fits the rear disk-shaped end of the forked reach, the disk ends being secured together by a central pivotal bolt and the forward end of the forked reach being provided with holes through which the axle of the rear wheel of the bicycle extends, as hereinafter more particularly explained.

Figure 1 is a perspective view of my combined bicycle and vehicle. Fig. 2 is an enlarged perspective detail of the front forked reach and its connection to the rear forked bracket when arranged for a single bicycle.

In the drawings like letters of reference indicate corresponding parts in each figure.

A is the vehicle, which in this case is a cart which is evenly balanced over the axle A' and has wheels B with pneumatic tires.

C is the bottom of the vehicle, and D the rear wheel of the bicycle.

$d$ is the axle of the rear wheel.

In Fig. 1 it will be seen that I provide a forked bracket E, both members of the rear portion of the fork being secured by bolts $e$ to the bottom of the vehicle. The front end has two flat disk-shaped jaws $e'$ $e'$, attached to or forming part of the front portion of the forked bracket E. Between the disk-shaped members $e'$ $e'$ of the forked bracket E fits the rear flat disk-shaped end $f$ of the forked reach F, which is formed as shown.

G is a bolt, which extends through holes made in the disk-shaped members $e'$, $e'$, and $f$. The lower end of the bolt is provided with a nut G'. The disk-shaped ends of the forked bracket and forked reach are of sufficient diameter, so as to make the connection between the fork and the bracket rigid and yet permit of the lateral swing of the forked reach upon its pivotal bolt G.

H are brackets having tubular upper ends H' and lower ends H² at right angles to the upper ends. The axle of the bicycle passes through the lower ends H², and the front ends of the forked reach extend through the upper tubular ends H', the front ends of the forked reach being threaded and having screwed onto them the nuts $h$, which prevent the forked reach from rearward movement but allow of it moving forwardly within the tubular ends H'. By this means a flexible connection is secured between the axle of the bicycle and forked reach, upon which the draft of the bicycle is exerted, and any jar or shock by the connection of the bicycle to the vehicle is avoided.

Although I show the forward end of the forked reach F connected to the axle of the bicycle by the brackets H it will of course be understood that the front ends of the forked reach might be made with holes in them, which might be directly connected to the axle, and these would serve the purpose to a certain extent if the holes in the end of the forked reach were elongated; but I prefer the form shown, as more efficient.

What I claim as my invention is—

1. The combination with a vehicle having a forked bracket secured beneath the vehicle, of a bicycle having a forked reach pivotally swung at its forward end on the axle of the drive-wheel and pivotally connected at its rear end to the forked bracket extending outwardly from the front of the vehicle as and for the purpose specified.

2. The combination with a two-wheeled cart having the body evenly balanced over the axle and the front forked bracket secured beneath the front portion of the vehicle and having a disk-shaped outer end, of a bicycle having a forked reach connected at the front end to the rear axle of the bicycle and having a rear disk-shaped end extending between the disk-shaped jaws at the front of the forked bracket and a pivotal bolt extending through the jaws and disk-shaped end as and for the purpose specified.

3. The combination with a vehicle having a forked bracket secured beneath the vehicle, of a bicycle having the double brackets H with tubular upper and lower ends H' and H² and the forked bracket F having the threaded ends extending through the tubular upper ends H' of the bracket, nuts $h$ to hold the forward ends of the forked reach in position, the forked reach being connected at the rear to the front bracket of the bicycle as and for the purpose specified.

JEAN TRANCLÉ-ARMAND.

Witnesses:
 B. BOYD,
 H. H. YOUNG.